(12) United States Patent
Saito

(10) Patent No.: US 11,171,954 B2
(45) Date of Patent: Nov. 9, 2021

(54) SERVER AND NON-TRANSITORY COMPUTER-READABLE RECORDING MEDIUM STORING COMPUTER-READABLE INSTRUCTIONS FOR SERVER

(71) Applicant: BROTHER KOGYO KABUSHIKI KAISHA, Nagoya (JP)

(72) Inventor: Ken Saito, Tokoname (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 323 days.

(21) Appl. No.: 16/263,029

(22) Filed: Jan. 31, 2019

(65) Prior Publication Data

US 2019/0245854 A1    Aug. 8, 2019

(30) Foreign Application Priority Data

Feb. 2, 2018   (JP) .............................. JP2018-017448

(51) Int. Cl.
*H04L 29/06*   (2006.01)
*G06F 21/44*   (2013.01)
(Continued)

(52) U.S. Cl.
CPC .......... *H04L 63/0876* (2013.01); *G06F 21/44* (2013.01); *G06F 21/608* (2013.01);
(Continued)

(58) Field of Classification Search
CPC ... H04L 63/0876; H04L 63/126; H04L 51/28; G06F 21/44
(Continued)

(56) References Cited

U.S. PATENT DOCUMENTS 9,001,370 B1\* 4/2015 Nuggehalli ........ H04N 1/00244
358/1.15
2003/0177023 A1 9/2003 Shibusawa
(Continued)

FOREIGN PATENT DOCUMENTS

| JP | 2000148845 A | 5/2000 |
| JP | 2003167995 A | 6/2003 |
| JP | 2003196468 A | 7/2003 |

OTHER PUBLICATIONS ip.com, "Printing Documents on a Multifunction Printer from Web hosted service", Dec. 21, 2010, IP.com, IPCOM000202532D, pp. 1-3. (Year: 2010).\*

(Continued)

*Primary Examiner* — Peter C Shaw
(74) *Attorney, Agent, or Firm* — Scully, Scott, Murphy & Presser, PC

(57) ABSTRACT

A server may receive a target e-mail address from a terminal device; store in the memory the target e-mail address and authentication information in association with each other; send a first e-mail including the target e-mail address, as a destination address, and the authentication information; receive the authentication information from the first communication device; specify the target e-mail address associated with the authentication information in the memory; and execute a predetermined process by using the target e-mail address, the predetermined process being a process which is necessary for the server or the first communication device to send a second e-mail including the target e-mail address, as a destination address, and related information related to the first communication device.

12 Claims, 10 Drawing Sheets

(51) Int. Cl.
 *G06F 21/60* (2013.01)
 *G06Q 30/00* (2012.01)
 *H04L 12/58* (2006.01)
 *G06F 3/12* (2006.01)

(52) U.S. Cl.
 CPC ............ *H04L 63/08* (2013.01); *H04L 63/126* (2013.01); *G06F 3/12* (2013.01); *G06Q 30/016* (2013.01); *H04L 51/00* (2013.01); *H04L 51/28* (2013.01)

(58) Field of Classification Search
 USPC .......................................................... 726/5
 See application file for complete search history.

(56) References Cited

U.S. PATENT DOCUMENTS

| | | | | |
|---|---|---|---|---|
| 2013/0222840 A1* | 8/2013 | Hosoda | .............. | H04N 1/00204 358/1.14 |
| 2014/0281506 A1* | 9/2014 | Redberg | .................. | H04L 63/10 713/159 |
| 2019/0007404 A1* | 1/2019 | Igari | .................... | H04L 63/0807 |

OTHER PUBLICATIONS

"IEEE Standard for Information Technology: Hardcopy Device and System Security," in IEEE Unapproved Draft Std P2600_D33b, Feb. 2008 , vol., No., pp. 1-173, Dec. 31, 2008. (Year: 2008).*

* cited by examiner

SERVER AND NON-TRANSITORY COMPUTER-READABLE RECORDING MEDIUM STORING COMPUTER-READABLE INSTRUCTIONS FOR SERVER

CROSS-REFERENCE

This application claims priority to Japanese Patent Application No. 2018-017448, filed on Feb. 2, 2018, the entire contents of which are incorporated herein by reference.

TECHNICAL FIELD

The present specification discloses a technique related to a server configured to execute a predetermined process by using an e-mail address received from a terminal device.

BACKGROUND ART

A technique for registering personal information of a product purchaser in a user registration system is known. When purchasing a product, the product purchaser presents personal information including an e-mail address to a vendor, and the vendor temporarily registers the personal information in the user registration system by using a PC. Using the e-mail address in the temporarily registered personal information as a destination, the user registration system sends an e-mail, to a PC of the product purchaser, for inquiring whether to register the personal information in the user registration system. In a case where a response is received from the product purchaser indicating that the personal information is to be registered in the user registration system, the user registration system registers the personal information of the product purchaser.

SUMMARY

In the aforementioned technique, the vendor must input the e-mail address by using the PC in order to register the e-mail address of the product purchaser.

The present specification discloses a technique that realizes sending of an e-mail that includes related information related to a first communication device with a target e-mail address as a destination address without requiring a user to input the target e-mail address to the first communication device.

A server disclosed herein may comprise: a processor; and a memory storing computer-readable instructions therein, the computer-readable instructions, when executed by the processor, causing the server to: receive a target e-mail address from a terminal device; in a case where the target e-mail address is received from the terminal device, store in the memory the target e-mail address and authentication information in association with each other; in the case where the target e-mail address is received from the terminal device, send a first e-mail including the target e-mail address, as a destination address, and the authentication information; in a case where an input operation of the authentication information is executed by a user in a first communication device different from the terminal device after the first e-mail has been sent, receive the authentication information from the first communication device; in a case where the authentication information is received from the first communication device, specify the target e-mail address associated with the authentication information in the memory; and in a case where the target e-mail address is specified, execute a predetermined process by using the target e-mail address, the predetermined process being a process which is necessary for the server or the first communication device to send a second e-mail including the target e-mail address, as a destination address, and related information related to the first communication device.

A control method, a computer program and a non-transitory computer-readable medium storing the computer program for implementing the above server are also novel and useful. Further, a communication system comprising the above server and another device (for example, the terminal device, the first communication device) is also novel and useful.

BRIEF DESCRIPTION OF THE DRAWINGS

EMBODIMENTS (Configuration of Communication System 2; FIG. 1)

As shown in FIG. 1, a communication system 2 comprises a server 10, a Multi-Function Peripheral (hereinbelow termed "MFP") 50, a store terminal 60, and a user PC (abbreviation of Personal Computer) 70. The devices 10, 50, 60, 70 are connected to Internet 4. Consequently, the devices 10, 50, 60, 70 are configured to communicate with each other via the Internet 4.

(Configuration of Server 10)

Figure 1:
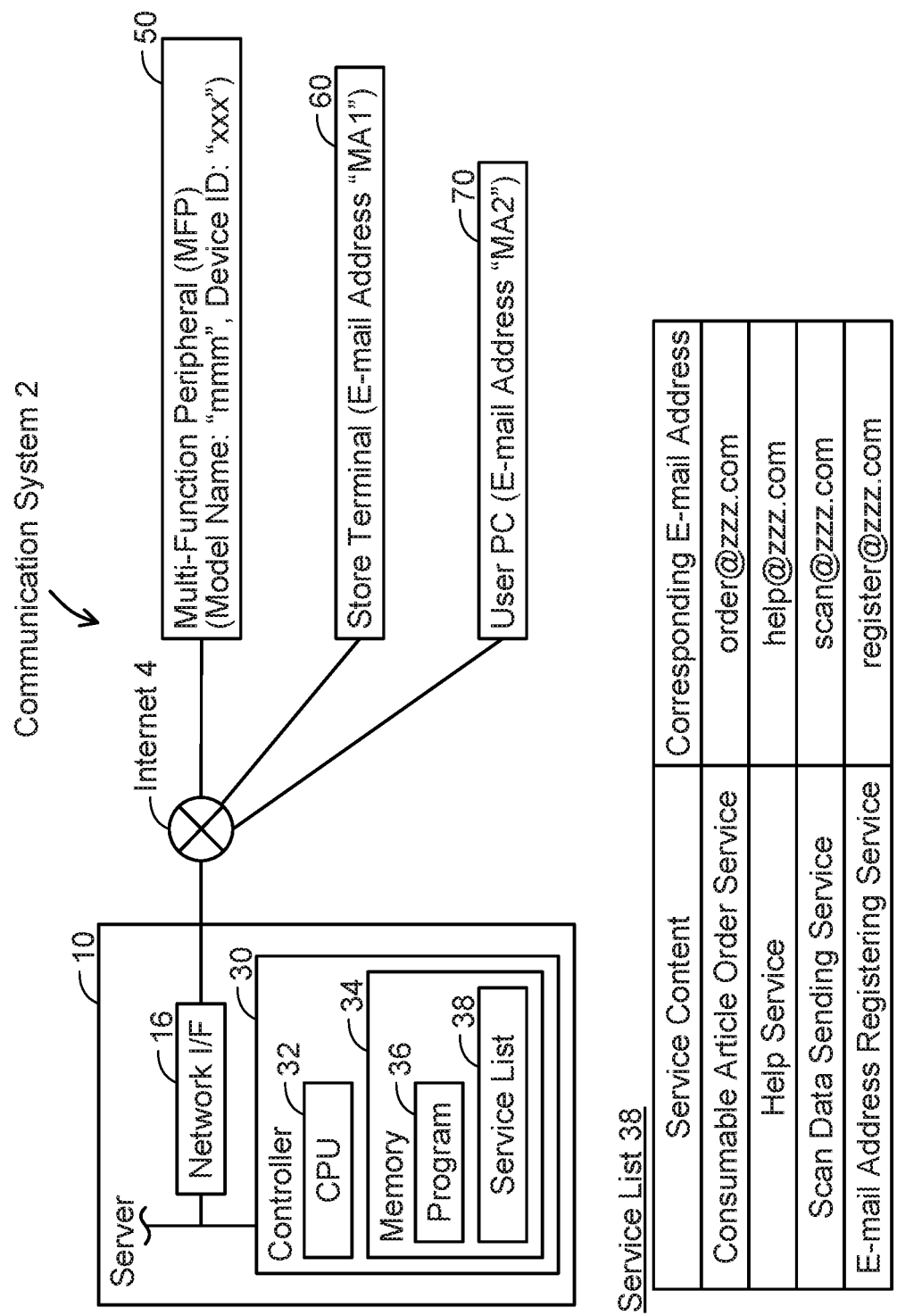
FIG. 1 shows a configuration of a communication system.

The server 10 is a server located on the Internet 4 by the vendor of the MFP 50, and provides a plurality of types of service related to the MFP 50. The server 10 comprises a network interface 16 and a controller 30. Hereinbelow, interface is denoted as "I/F". The units 16, 30 are connected to a bus line (reference number omitted). The network I/F 16 is connected to the Internet 4.

The controller 30 comprises a CPU 32 and a memory 34. The CPU 32 executes various processes in accordance with a program 36 stored in the memory 34. The memory 34 is configured by a volatile memory, a non-volatile memory, or the like. The memory 34 stores the program 36 and a service list 38.

In the service list 38, for each of a plurality of types of service, information indicating the content of the service, and an e-mail address for receiving provision of the service, are associated with one another. In a case of receiving an e-mail including all the e-mail addresses in the service list 38 as a destination address, the server 10 executes a process for providing the service associated with the e-mail address. Here, any of the e-mail addresses in the service list 38 includes a domain "zzz.com" assigned to the server 10. Consequently, an e-mail including an e-mail address that includes the domain "zzz.com" as the destination address is received by the server 10.

The plurality of types of service will be described. A consumable article order service is a service that mediates ordering of a consumable article to be attached to an MFP (e.g., 50). A help service is a service that notifies error information relating to an error that has occurred in the MFP to a vendor's store. A scan data sending service is a service that causes the MFP to execute scanning and the sending of scan data. An e-mail address registering service is a service that registers an e-mail address in an address book of the MFP.

(Configuration of MFP 50)

The MFP 50 is a peripheral device configured to execute multiple functions including a print function and a scan function (e.g., a peripheral device of the user PC 70 or the like). The MFP 50 has a model name "mmm" and a device ID "xxx". The device ID is information for identifying the MFP, e.g., a serial number of the MFP 50.

(Configuration of Store Terminal 60)

The store terminal 60 is a terminal used by a salesperson belonging to a store selling the MFP. The store terminal 60 is a portable terminal device such as a mobile telephone (e.g., smartphone), PDA, notebook PC, tablet PC. Moreover, in a variant, a PC 10 may be a stationary terminal device such as a PC. An e-mail address MA1 is assigned to the salesperson using the store terminal 60, and the e-mail address MA1 is set as the e-mail address of the store terminal 60 in a mailer (not shown) of the store terminal 60.

(Configuration of User PC 70)

The user PC 70 is a portable or stationary PC. The user PC 70 is used by the user of the MFP 50. An e-mail address MA2 is assigned to the user of the user PC 70, and the e-mail address MA2 is set as the e-mail address of the user PC 70 in a mailer (not shown) of the user PC 70.

(Specific Cases; FIG. 2 to FIG. 6)

Next, specific cases realized by the devices 10, 50, 60, 70 will be described with reference to FIG. 2 to FIG. 6. Hereinbelow, to facilitate understanding, operations executed by CPUs of the devices 10, 50, 60, 70 (e.g., the CPU 32 of the server 10) are not expressed with the CPU as the subject, but with the device (e.g., the server 10) as the subject. Further, communication executed between the devices 10, 50, 60, 70 is executed via the Internet 4. Consequently, hereinbelow, "via the Internet 4" is omitted. Further, the server 10 executes communication with the devices 50, 60, 70 via the network I/F 16. Consequently, hereinbelow, "via the network I/F 16" is omitted.

Figure 2:
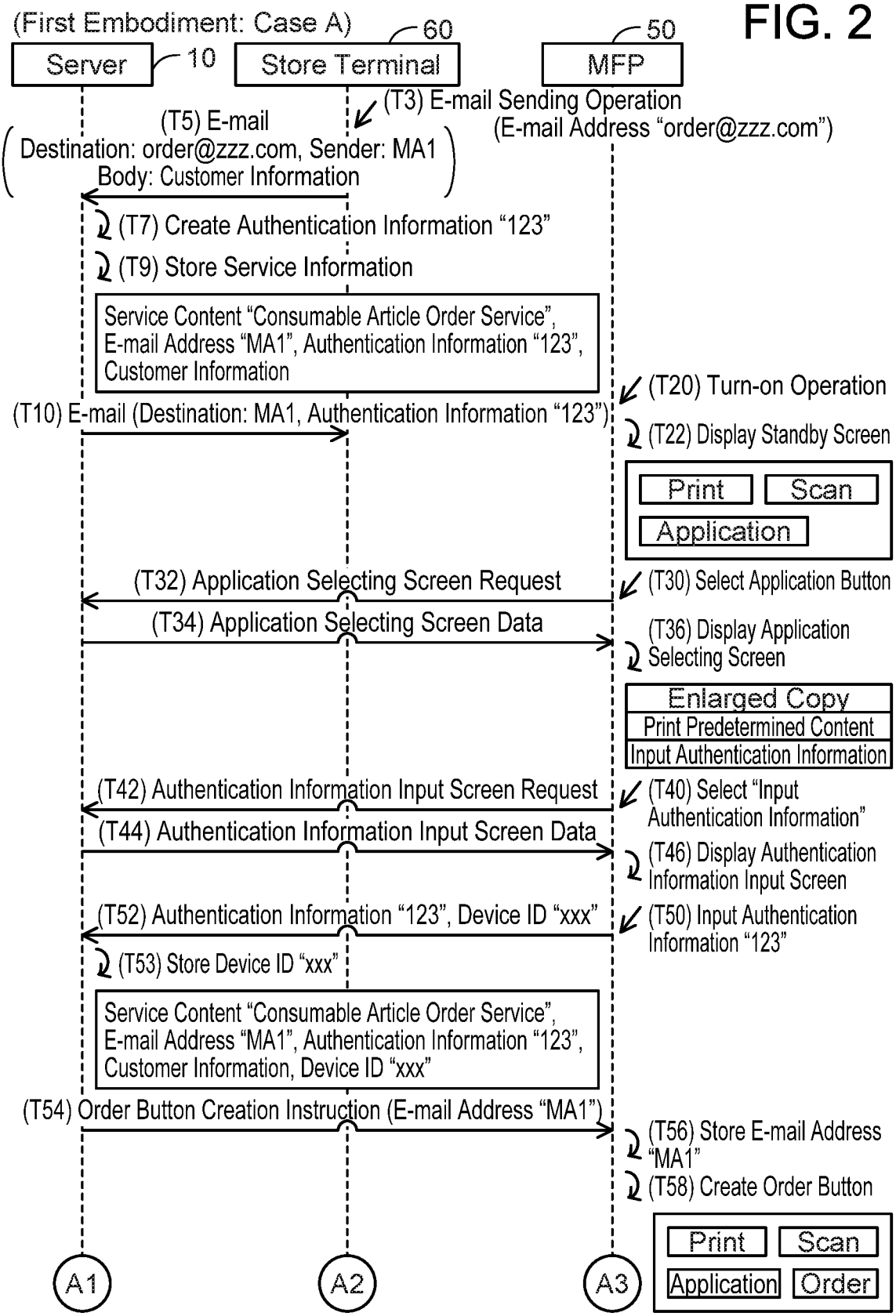
FIG. 2 shows a sequence diagram of Case A in which an e-mail for ordering a consumable article is sent.
Figure 3:
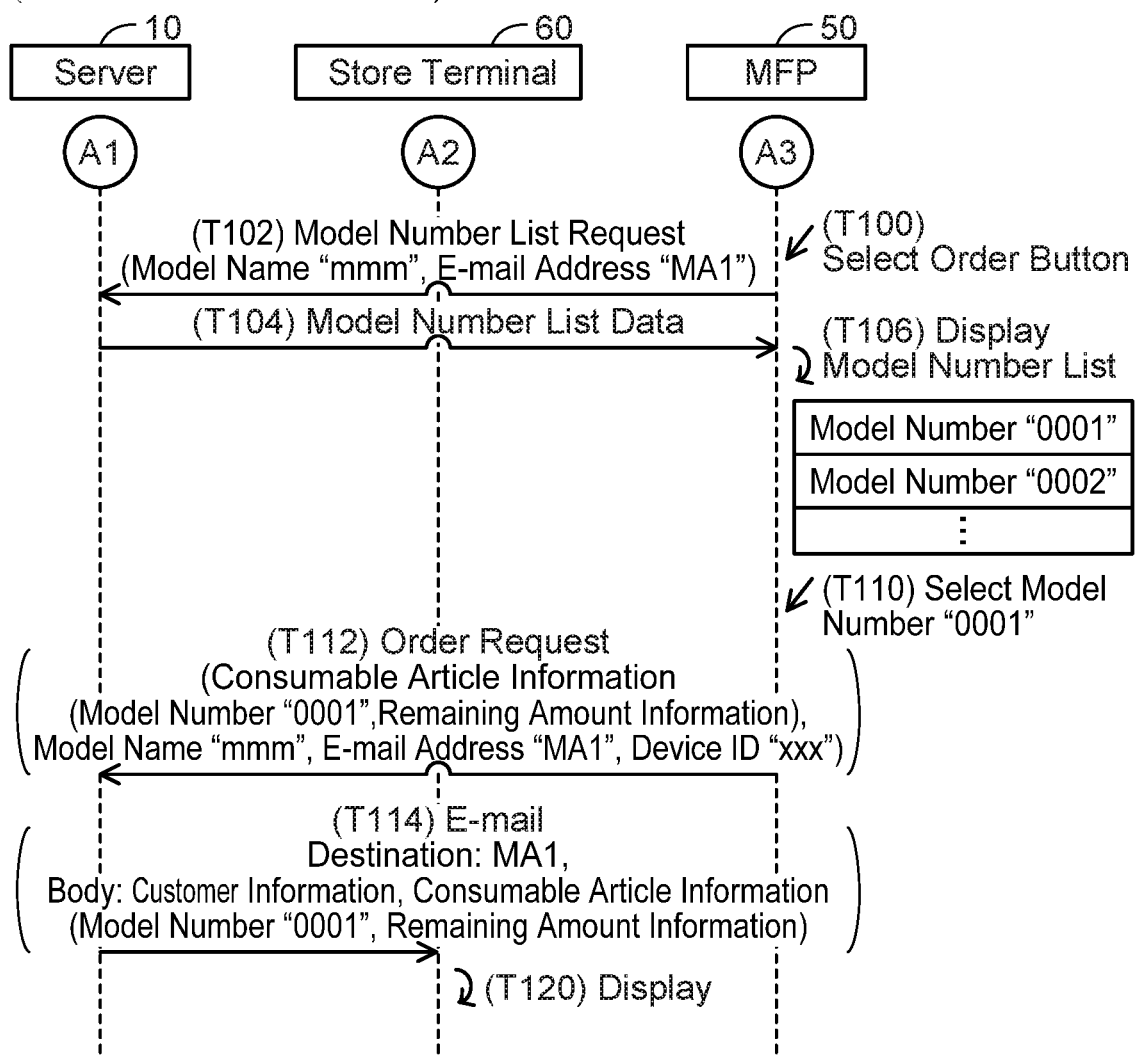
FIG. 3 shows a sequence diagram of a continuation of FIG. 2.

(Case A; FIG. 2 and FIG. 3)

First, Case A, in which an e-mail for ordering a consumable article is sent, will be described with reference to FIG. 2 and FIG. 3. In Case A, a situation is assumed in which the salesperson using the store terminal 60 realizes provision of the consumable article order service for the MFP 50 when the MFP 50 is installed in an office or the like of the purchaser of the MFP 50 (i.e., the user of the MFP 50).

In T3, the store terminal 60 accepts, from the salesperson, an e-mail sending operation for sending an e-mail. The e-mail sending operation includes designation of a destination e-mail address "order@zzz.com", and input of customer information into a body. The e-mail address "order@zzz.com" is an e-mail address associated with information indicating the "consumable article order service" in the service list 38 of the server 10 (see FIG. 1). The customer information includes e.g., name of the purchaser of the MFP 50 and address of the place of installation of the MFP 50. In this case, in T5, the store terminal 60 sends an e-mail. The e-mail includes the e-mail address "order@zzz.com" designated by the salesperson as the destination address, includes the e-mail address MA1 set in the store terminal 60 as the sender address, and includes a body in which the customer information inputted by the salesperson is written.

In response to receiving the e-mail from the store terminal 60 in T5, the server 10 acquires the destination e-mail address "order@zzz.com" from the received e-mail, and specifies the service content "consumable article order service" associated with the acquired e-mail address "order@zzz.com" in the service list 38. Next, in T7 the server 10 creates authentication information "123" having a unique character string and, in T9 stores, in the memory 34, service information in which the specified service content "consumable article order service", the sender e-mail address MA1 in the received e-mail, the created authentication information "123", and the customer information in the body of the received e-mail are associated with one another. Next, in T10, the server 10 sends an e-mail. The e-mail includes the e-mail address MA1 stored in T9 as the destination address, and a body in which the authentication information "123" stored in T9 is written.

Upon receiving the e-mail from the server 10 in T10, the store terminal 60 displays the authentication information "123" written in the body of the e-mail. Thereby, the salesperson can learn the authentication information "123".

The MFP 50 is set up in an office, for example by the salesperson. Thereafter, in response to a turn-on operation being executed on the MFP 50 by the salesperson in T20, in T22 the MFP 50 displays a standby screen. The standby screen is a screen displayed in a case where the MFP 50 is not executing a process such as a print process (a so-called home screen), and includes a print button, a scan button, and an application button. The print button and the scan button are buttons for causing the MFP 50 to execute a print function and a scan function, respectively. The application button is a button for causing the MFP 50 to execute a function different from the normal print function and scan function.

In response to the application button being selected by the salesperson in T30, in T32 the MFP 50 sends an application selecting screen request to the server 10 for requesting an application selecting screen to the server 10.

In response to receiving the application selecting screen request from the MFP 50 in T32, in T34 the server 10 sends application selecting screen data representing the application selecting screen, to the MFP 50.

In response to receiving the application selecting screen data from the server 10 in T34, in T36 the MFP 50 displays the application selecting screen represented by the application selecting screen data. The application selecting screen includes, e.g., an enlarged copy button for executing an enlarged copy, a print predetermined content button for printing a content in, e.g., a predetermined server, and an input authentication information button for inputting authentication information.

In response to the input authentication information button being selected in T40, in T42 the MFP 50 sends, to the server 10, an authentication information input screen request for requesting an authentication information input screen for inputting the authentication information.

In response to receiving the authentication information input screen request from the MFP 50 in T42, in T44 the server 10 sends, to the MFP 50, authentication information input screen data representing the authentication information input screen.

In response to receiving the authentication information input screen data from the server 10 in T44, in T46 the MFP 50 displays the authentication information input screen represented by the authentication information input screen data. Then, in response to accepting input of the authentication information "123" from the salesperson in T50, in T52 the MFP 50 sends the authentication information "123" and the device ID "xxx" of the MFP 50 to the server 10.

In a case of receiving the authentication information "123" and the device ID "xxx" from the MFP 50 in T52, the server 10 determines whether the authentication information "123" has been stored in the memory 34. In a case of determining that the authentication information "123" has been stored, i.e., in the case authentication succeeds, in T53 the server 10 stores the device ID "xxx" in the service information that includes the authentication information "123", specifies the e-mail address MA1 associated with the authentication information "123" in the memory 34 (see T9) and, in T54, sends an order button creation instruction including the specified e-mail address MA1 to the MFP 50. The order button creation instruction is an instruction for causing the MFP 50 to execute creation of an order button in the standby screen.

In response to receiving the order button creation instruction from the server 10 in T54, in T56 the MFP 50 stores the e-mail address MA1 in the order button creation instruction and, in T58, creates the order button in the standby screen. The order button is a button for the user of the MFP 50 to order a consumable article. In a case where the remaining amount of the consumable article attached to the MFP 50 becomes small, the user of the MFP 50 can receive provision of the consumable article order service by selecting the order button in the standby screen.

(Continuation of FIG. 2; FIG. 3)

Next, processing that is a continuation of FIG. 2 will be described with reference to FIG. 3. In a case where the order button in the standby screen is selected by the user in T100, in T102 the MFP 50 sends a model number list request to the server 10. The model number list request includes a model name "mmm" of the MFP 50, and the stored e-mail address MA1 (see T56 of FIG. 2).

In response to receiving the model number list request from the MFP 50 in T102, the server 10 specifies the service content "consumable article order service" associated with the e-mail address MA1 in the received model number list request, and executes a process for providing the consumable article order service. Although not shown, for each of a plurality of models of MFP, the memory 34 of the server 10 stores model numbers of a plurality of types of consumable article that can be attached to that model of MFP. In T104 the server 10 specifies, from the memory 34, the model number of the plurality of types of consumable article that can be attached to the MFP having the model name "mmm" in the model number list request, and sends, to the MFP 50, model number list data representing a model number list showing the model numbers of the plurality of types of consumable article that have been specified.

In response to receiving the model number list data from the server 10 in T104, in T106 the MFP 50 displays the model number list represented by the model number list data. Next, in response to a model number "0001" in the model number list being selected by the user in T110, in T112 the MFP 50 sends an order request to the server 10 requesting the ordering of the consumable article having the selected model number "0001". The order request includes consumable article information, the model name "mmm", the e-mail address MA1, and the device ID "xxx". The consumable article information includes the selected model number "0001", and remaining amount information showing the remaining amount of the consumable article currently attached to the MFP 50.

In a case of receiving the order request from the MFP 50 in T112, the server 10 executes a process for ordering the consumable article by using the e-mail address MA1 in the order request. Specifically, the server 10 specifies the customer information in the service information including the received device ID "xxx" from the memory 34 (see T9 of FIG. 2) and, in T114, sends an e-mail. The e-mail includes the received e-mail address MA1 as the destination address, and includes a body in which the specified customer information and the received consumable article information are written. Moreover, as a variant, the device ID "xxx" may be written in the body in addition to the customer information and the consumable article information, or the device ID "xxx" may be written in the body instead of the customer information. Further, e.g., the device ID "xxx" may be written in the body in a case where the customer information is not included in the service information stored in T9 of FIG. 2.

In response to receiving the e-mail from the server 10 in T114, in T120 the store terminal 60 displays the received e-mail. As a result, the salesperson can learn the customer information and the consumable article information written in the body of the e-mail. The salesperson can send the consumable article having the model number "0001" indicated by the consumable article information to the address indicated by the customer information. When the process of T120 ends, Case A ends.

Figure 4:
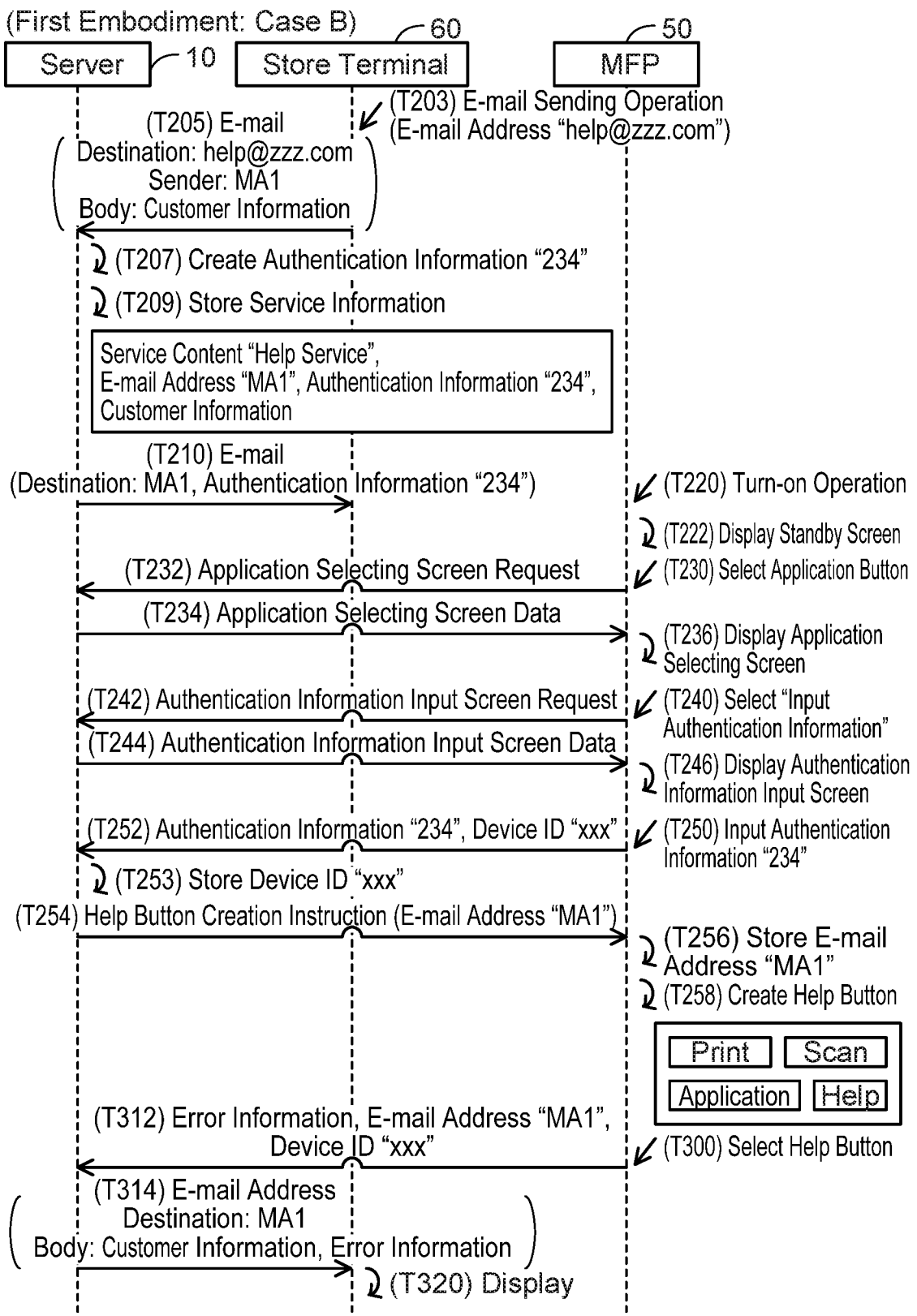
FIG. 4 shows a sequence diagram of Case B in which an e-mail including error information is sent.

(Case B; FIG. 4)

Next, Case B, in which an e-mail including error information of the MFP 50 is sent, will be described with reference to FIG. 4. In Case B, a situation is assumed in which the salesperson using the store terminal 60 realizes provision of the help service for the MFP 50 when installing the MFP 50 in an office or the like of the purchaser of the MFP 50 (i.e., the user of the MFP 50).

T203 and T205 are similar to T3 and T5 of FIG. 2 except that a destination e-mail address "help@zzz.com" is designated by the salesperson. The e-mail address "help@zzz.com" is an e-mail address associated with information indicating "help service" in the service list 38 of the server 10 (see FIG. 1).

In response to receiving an e-mail from the store terminal 60 in T205, the server 10 acquires the destination e-mail address "help@zzz.com" from the received e-mail, and specifies the service content "help service" associated with the acquired e-mail address "help@zzz.com" in the service list 38. Next, in T207 the server 10 creates authentication information "234". T209 and T210 are similar to T9 and T10 of FIG. 2 except that the service content "help service" and the authentication information "234" are used.

T220 to T246 are similar to T20 to T46 of FIG. 2. In response to accepting input of the authentication information "234" from the salesperson in T250, in T252 the MFP 50 sends the authentication information "234" and the device ID "xxx" of the MFP 50 to the server 10.

In response to receiving the authentication information "234" and the device ID "xxx" from the MFP 50 in T252, the server 10 executes authentication of the authentication information "234" and, in the case authentication succeeds, in T253 stores the device ID "xxx" in the service information including the authentication information "234", specifies the e-mail address MA1 associated with the authentication information "234" in the memory 34 and, in T254, sends a help button creation instruction including the specified e-mail address MA1, to the MFP 50. The help button creation instruction is an instruction for causing the MFP 50 to execute the creation of a help button in the standby screen.

In response to receiving the help button creation instruction from the server 10 in T254, in T256 the MFP 50 stores the e-mail address MA1 that is in the help button creation instruction and, in T258 creates the help button in the standby screen. The help button is a button for the user of the MFP 50 to notify the store of an error that has occurred the MFP 50. In a case where an error, such as a paper jam, has occurred in the MFP 50, the user of the MFP 50 can receive the provision of the help service by selecting the help button in the standby screen.

In a case where the help button in the standby screen is selected by the user of the MFP 50 in T300, in T312 the MFP 50 sends error information relating to the error that has occurred in the MFP 50, the stored e-mail address MA1, and the device ID "xxx" to the server 10.

In a case of receiving the error information, the e-mail address MA1, and the device ID "xxx" from the MFP 50 in T312, the server 10 executes a process to notify the store of the error information by using the received e-mail address MA1. Specifically, the server 10 specifies the customer information in the service information that includes the received device ID "xxx" from the memory 34 (see T209), and sends an e-mail in T314. The e-mail includes the received e-mail address MA1 as the destination address, and includes a body in which the specified customer information and the received error information are written.

In response to receiving the e-mail from the server 10 in T314, in T320 the store terminal 60 displays the received e-mail. As a result, the salesperson can learn the customer information and the error information written in the body of the e-mail. Then, the salesperson can visit the address indicated by the customer information and, based on the error information, can resolve the error that has occurred in the MFP 50. When the process of T320 ends, Case B ends.

Figure 5:
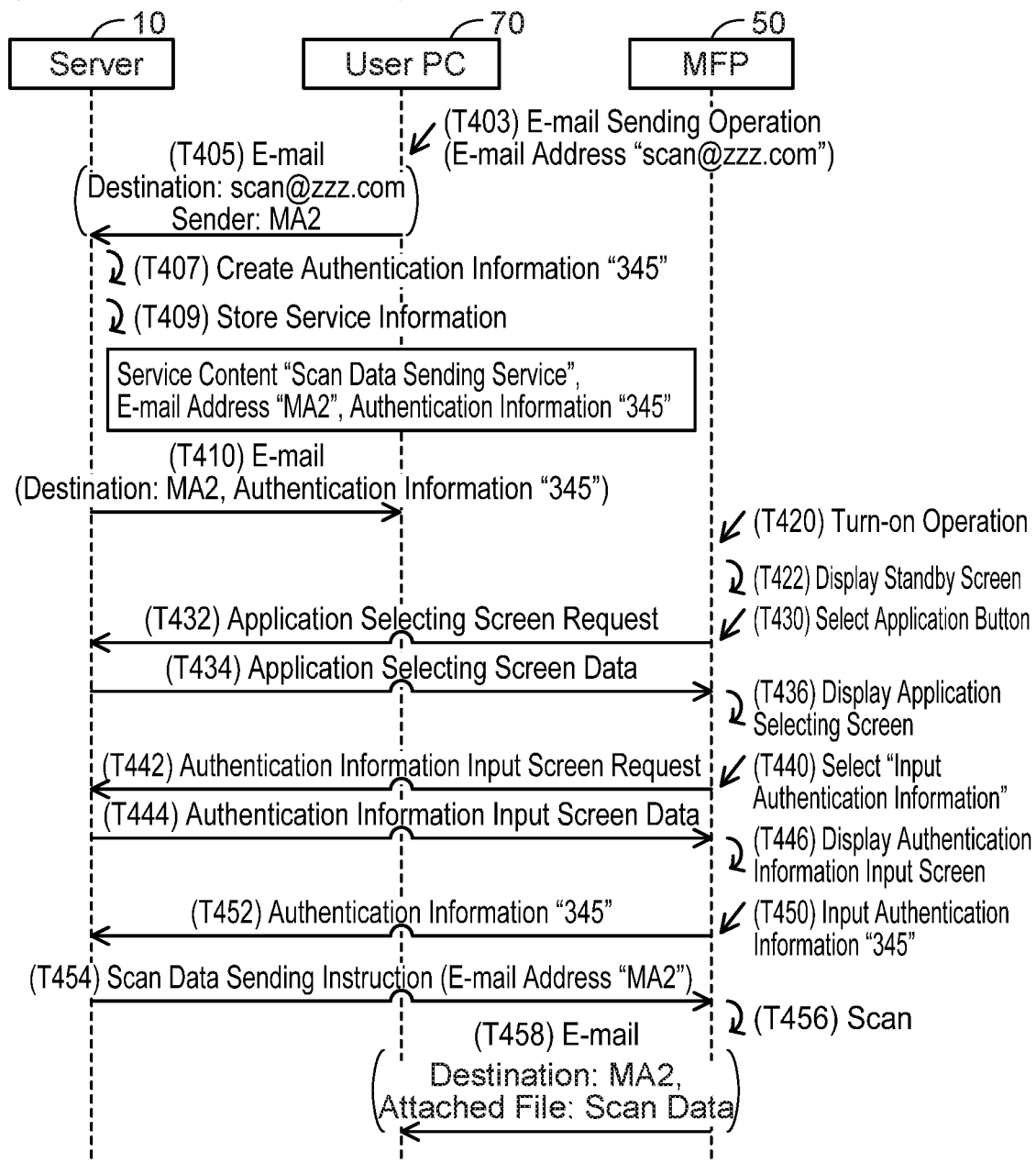
FIG. 5 shows a sequence diagram of Case C in which an e-mail including scan data is sent.

(Case C; FIG. 5)

Next, Case C, in which an e-mail including scan data is sent, will be described with reference to FIG. 5. In Case C, a situation is assumed in which a scan data sending service is provided in which the user causes the MFP 50 to execute a scan, and scan data is sent to the user PC 70.

In T403, the user PC 70 accepts, from the user, an e-mail sending operation for sending e-mail. The e-mail sending operation includes designation of a destination e-mail address "scan@zzz.com". The e-mail address "scan@zzz.com" is an e-mail address associated with information indicating the "scan data sending service" in the service list 38 of the server 10 (see FIG. 1). In this case, the user PC 70 sends an e-mail in T405. The e-mail includes the e-mail address "scan@zzz.com" designated by the user as the destination address, and includes the e-mail address MA2 set in the user PC 70 as a sender address.

In response to receiving the e-mail from the user PC 70 in T405, the server 10 acquires the destination e-mail address "scan@zzz.com" from the received e-mail, and specifies the service content "scan data sending service" associated with the acquired e-mail address "scan@zzz.com" in the service list 38. Next, in T407, the server 10 creates authentication information "345" and, in T409 stores, in the memory 34, service information in which the specified service content "scan data sending service", the sender e-mail address MA2 in the received e-mail, and the created authentication information "345" are associated with one another. Moreover, in the present case, a body of the e-mail is not stored because the received e-mail does not include a body. T410 is similar to T10 of FIG. 2, except that the authentication information "345" and the e-mail address MA2 are used.

T420 to T446 are similar to T20 to T46 of FIG. 2. In response to accepting input of the authentication information "345" from the user in T450, in T452 the MFP 50 sends the authentication information "345" to the server 10.

In response to receiving the authentication information "345" from the MFP 50 in T452, the server 10 executes authentication of the authentication information "345" and, in the case authentication succeeds, specifies the e-mail address MA2 associated with the authentication information "345" in the memory 34 and, in T454, sends a scan data sending instruction including the specified e-mail address MA2 to the MFP 50. The scan data sending instruction is an instruction for causing the MFP 50 to execute a scan and to execute sending of scan data.

In response to receiving the scan data sending instruction from the server 10 in T454, in T456 the MFP 50 executes a scan of a document and creates scan data and, in T458, sends an e-mail. The e-mail includes the e-mail address MA2 in the received scan data sending instruction as the destination address, and includes the created scan data as an attached file.

In T458, the user PC 70 receives the e-mail from the MFP 50. As a result, the user can use (e.g., display, process) the scan data in the user PC 70. When the process of T458 ends, Case C ends.

Figure 6:
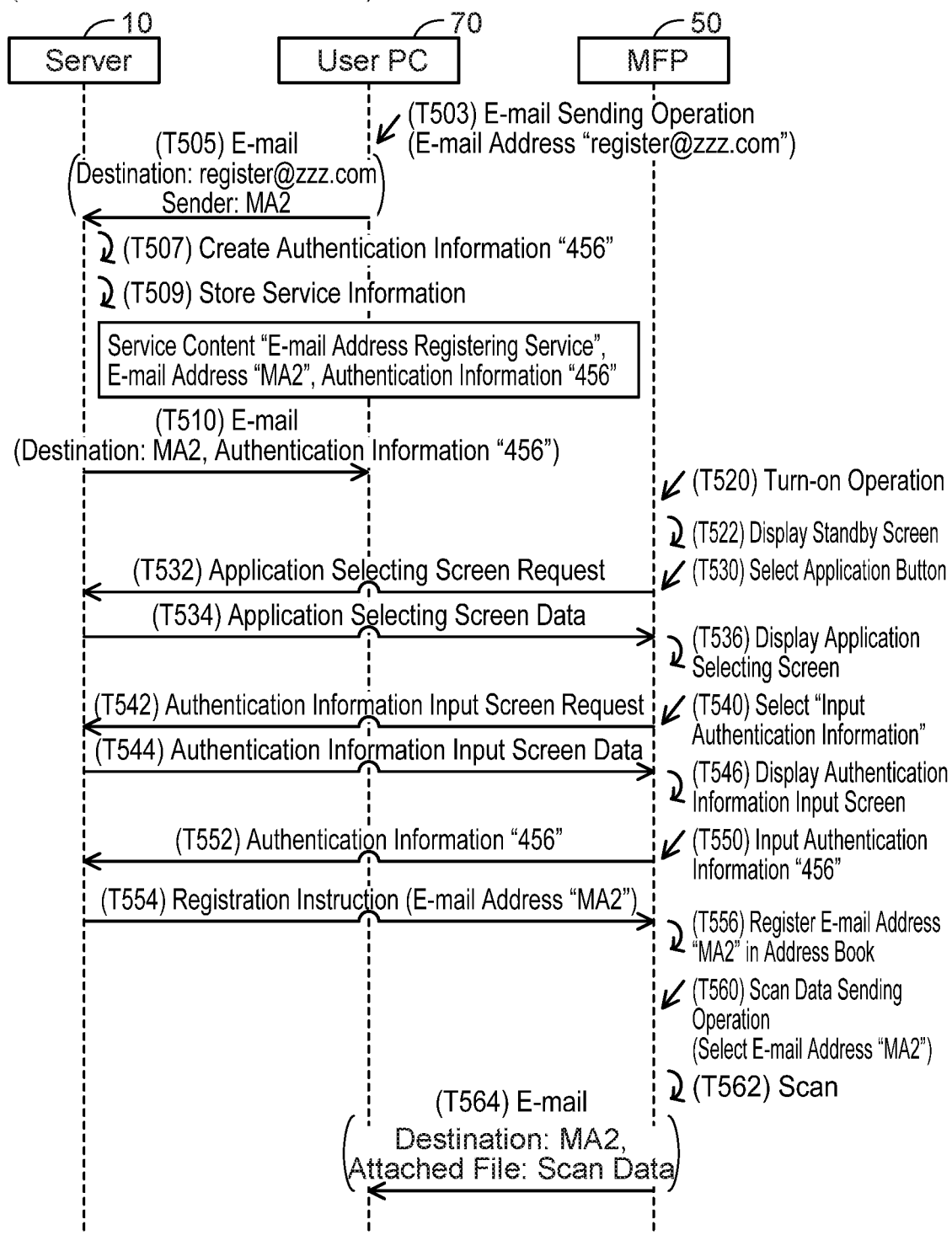
FIG. 6 shows a sequence diagram of Case D in which an e-mail is sent after an e-mail address has been registered in an address book.

(Case D; FIG. 6)

Next, Case D, in which an e-mail is sent after the e-mail address MA2 has been registered in the address book of the MFP 50, will be described with reference to FIG. 6. In Case D, a situation is assumed in which the user is provided with the e-mail address registering service for registering the e-mail address MA2 in the address book of the MFP 50.

T503 and T505 are similar to T403 and T405 of FIG. 5 except that a destination e-mail address "register@zzz.com" is designated by the user. The e-mail address "register@zzz.com" is an e-mail address associated with information indicating the "e-mail address registering service" in the service list 38 of the server 10 (see FIG. 1).

In a case of receiving an e-mail from the user PC 70 in T505, the server 10 acquires the destination e-mail address "register@zzz.com" from the received e-mail, specifies the service content "e-mail address registering service" associated with the acquired e-mail address "register@zzz.com" in the service list 38 and, in T507 creates authentication information "456". T509 and T510 are similar to T409 and T410 of FIG. 5 except that the service content "e-mail address registering service" and the authentication information "456" are used.

T520 to T546 are similar to T20 to T46 of FIG. 2. In response to accepting input of the authentication information "456" from the user in T550, in T552 the MFP 50 sends the authentication information "456" to the server 10.

In response to receiving the authentication information "456" from the MFP 50 in T552, the server 10 executes authentication of the authentication information "456" and, in the case authentication succeeds, specifies the e-mail address MA2 associated with the authentication information "456" in the memory 34 and, in T554, sends a registration instruction including the specified e-mail address MA2 to the MFP 50. The registration instruction is an instruction for causing the MFP 50 to execute registration of the e-mail address MA2 in the address book.

In response to receiving the registration instruction from the server 10 in T554, in T556 the MFP 50 registers, in the address book, the e-mail address MA2 in the registration instruction. Thereby, in T560, the MFP 50 can accept a scan data sending operation from the user that includes selection of the e-mail address MA2 in the address book. In this case, in T562 the MFP 50 executes a scan of a document, creates scan data and, in T564, sends an e-mail. The e-mail includes the selected e-mail address MA2 as the destination address, and includes the created scan data as the attached file. Thereby, the e-mail is executed by the user PC 70, and the user can use the scan data. When the process of T564 ends, Case B ends.

Effect of Present Embodiment

In the present embodiment, in the case of receiving the e-mail address MA1 (or the e-mail address MA2) from the store terminal 60 (or the user PC 70) (T3 of FIG. 2, T203 of FIG. 4, T403 of FIG. 5, T503 of FIG. 6), the server 10 stores the e-mail address MA1 (or MA2) and the authentication information ("123", etc.) in association with each other, and sends the e-mail including the authentication information (T5, T205, T405, T505). Thereafter, the input operation of the authentication information is executed by the salesperson (or user) in the MFP 50 and, in the case where the authentication information is received from the MFP 50 (T52, T252, T452, T552), the server 10 uses the e-mail address MA1 (or MA2) associated with the received authentication information to execute a predetermined process. Here, the predetermined process is a process needed for the server 10 or the MFP 50 to send the e-mail including the related information related to the MFP 50 with the e-mail address MA1 (or MA2) as the destination address. The predetermined process is as follows.

For example, in Case A of FIG. 2 and FIG. 3, the server 10 executes the process for sending the e-mail including the e-mail address MA1 as the destination address, and including the body in which the consumable article information is written (T54 to T114). Further, in Case B of FIG. 4, the server 10 executes the process for sending the e-mail including the e-mail address MA1 as the destination address, and including the body in which the error information is written (T254 to T314). Further, in Case C of FIG. 5, the server 10 executes the process for sending the e-mail including the e-mail address MA2 as the destination address, and including the scan data as the attached file (T454 to T458). Further, in Case D of FIG. 6, the server 10 registers the e-mail address MA2 in the address book of the MFP 50 in order to cause the MFP 50 to send the e-mail including the e-mail address MA2 as the destination address, and including the scan data as the attached file (T554). Consequently, without inputting the e-mail address MA1 (or MA2) to the MFP 50, the user can realize sending of the e-mail including the e-mail address MA1 (or MA2) as the destination address, and including related information related to the MFP 50 (e.g., consumable article information, error information, scan data).

(Correspondence Relationship)

The store terminal 60 and the user PC 70 are examples of "terminal device". The MFP 50 is an example of "first communication device". The e-mail address MA1 (or MA2) is an example of "target e-mail address". The e-mail sent in T10 of FIG. 2 (or T210 of FIG. 4, T410 of FIG. 5, T510 of FIG. 6), the e-mail sent in T114 of FIG. 3 (or T314, T458, T564), the e-mail sent in T5 (or T205, T405, T505) is an example of "first e-mail", "second e-mail", "third e-mail", respectively. The consumable article sending service, the help service, the scan data sending service, and the e-mail address registering service provided by the server 10 are examples of "predetermined process". The information indicating service content, and the corresponding e-mail address in the service list 38 is an example of "process identification information" and "predetermined process corresponding to e-mail address", respectively. The customer information is an example of "specific information". The consumable article information, the error information, and the scan data are examples of "related information".

The process of T5 (or T205, T405, T505), the process of T9 (or T209, T409, T509), the process of T10 (or T210, T410, T510), the process of T52 (or T252, T452, T552) are examples of processes executed by "receive a target e-mail address from a terminal device", "store in the memory the target e-mail address and authentication information in association with each other", "send a first e-mail", "receive the authentication information from the first communication device", respectively. The processes of T54 to T114 (or T254 to T314, T454, T554) are examples of processes executed by "specify the target e-mail address" and "execute a predetermined process", respectively.

Figure 7:
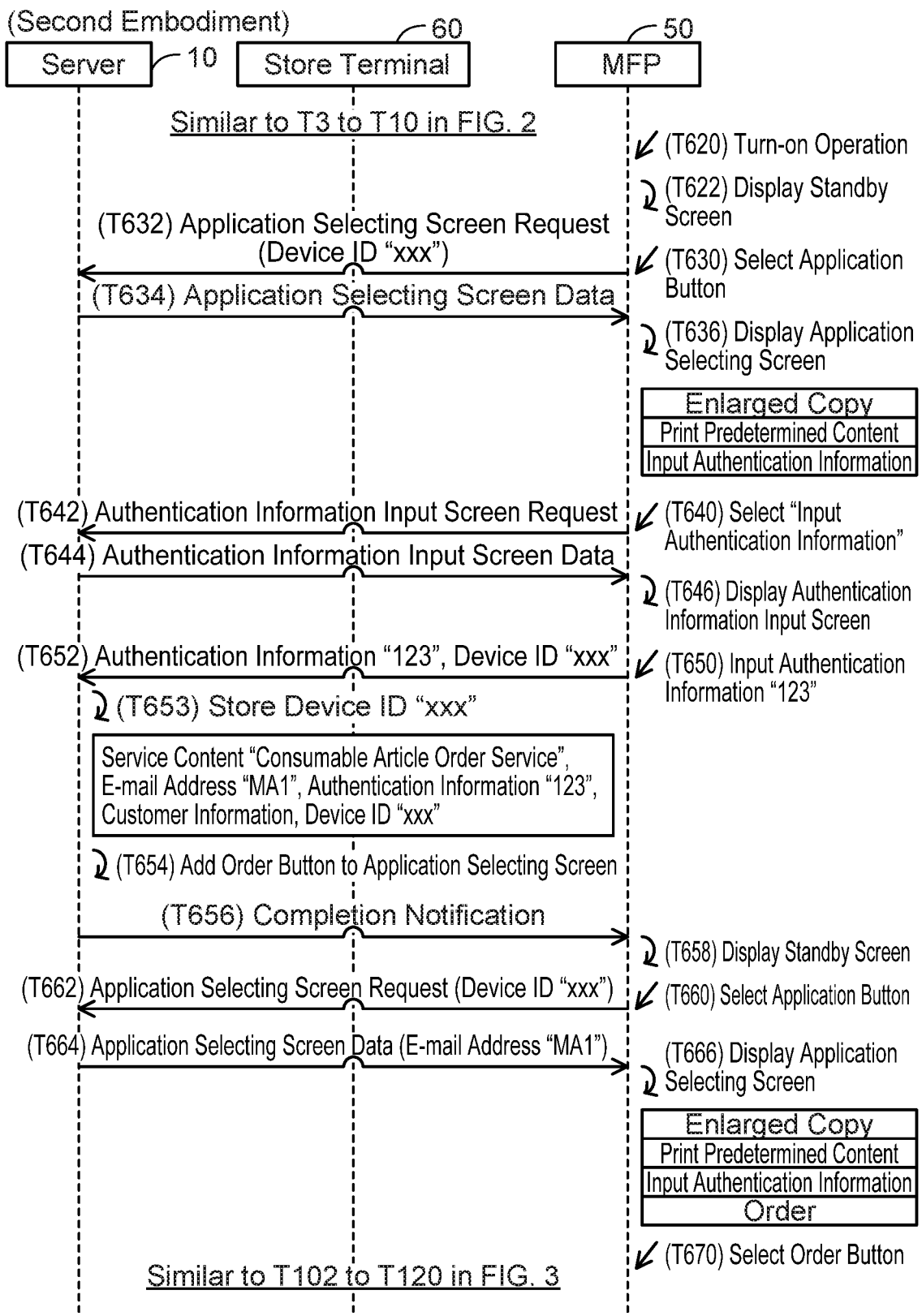
FIG. 7 shows a sequence diagram of a second embodiment.

Second Embodiment; FIG. 7

Next, a second embodiment will be described with reference to FIG. 7. The second embodiment is different from the first embodiment in that, in the same situation as Case A of the first embodiment, the order button is created in the application selecting screen.

First, processes similar to T3 to T10 of FIG. 2 are executed. T620 to T650 are similar to T20 to T50 of FIG. 2 except that the device ID "xxx" of the MFP 50 is included in the application selecting screen request. In response to receiving the authentication information "123" and the device ID "xxx" from the MFP 50 in T652, the server 10 executes authentication of the authentication information "123" and, in the case authentication succeeds, in T653 stores the device ID "xxx" in the service information that includes the authentication information "123", specifies the e-mail address MA1 associated with the authentication information "123" in the memory 34 and, in T654, updates the application selecting screen data. Specifically, an order button in which the device ID "xxx" and the specified e-mail address MA1 are associated with one another is created in the application selecting screen. In T656, the server 10 sends a completion notification to the MFP 50 indicating that the order button has been created in the application selecting screen.

In response to receiving the completion notification from the server 10 in T656, in T658 the MFP 50 displays the standby screen. In the case where the remaining amount of the consumable article attached to the MFP 50 has become small, in response to the application button in the standby screen being selected by the user in T660, in T662 the MFP 50 sends the application selecting screen request including the device ID "xxx" to the server 10.

In response to receiving the application selecting screen request from the MFP 50 in T662, in T664 the server 10 sends, to the MFP 50, the application selecting screen data representing the application selecting screen including the order button associated with the device ID "xxx" in the received application selecting screen request. The e-mail address MA1 is associated with the order button. That is, the application selecting screen data includes the e-mail address MA1.

In response to receiving the application selecting screen data from the server 10 in T664, in T666 the MFP 50 displays the application selecting screen represented by the application selecting screen data. As a result, in response to the user selecting the order button in the application selecting screen in T670, processes similar to T102 to T120 of FIG. 3 are executed.

Effect of Present Embodiment

In the present embodiment as well, sending of an e-mail including the e-mail address MA1 as the destination address, and including related information related to the MFP 50 (i.e., consumable article information), can be realized without the user inputting the e-mail address MA1 to the MFP 50.

Figure 8:
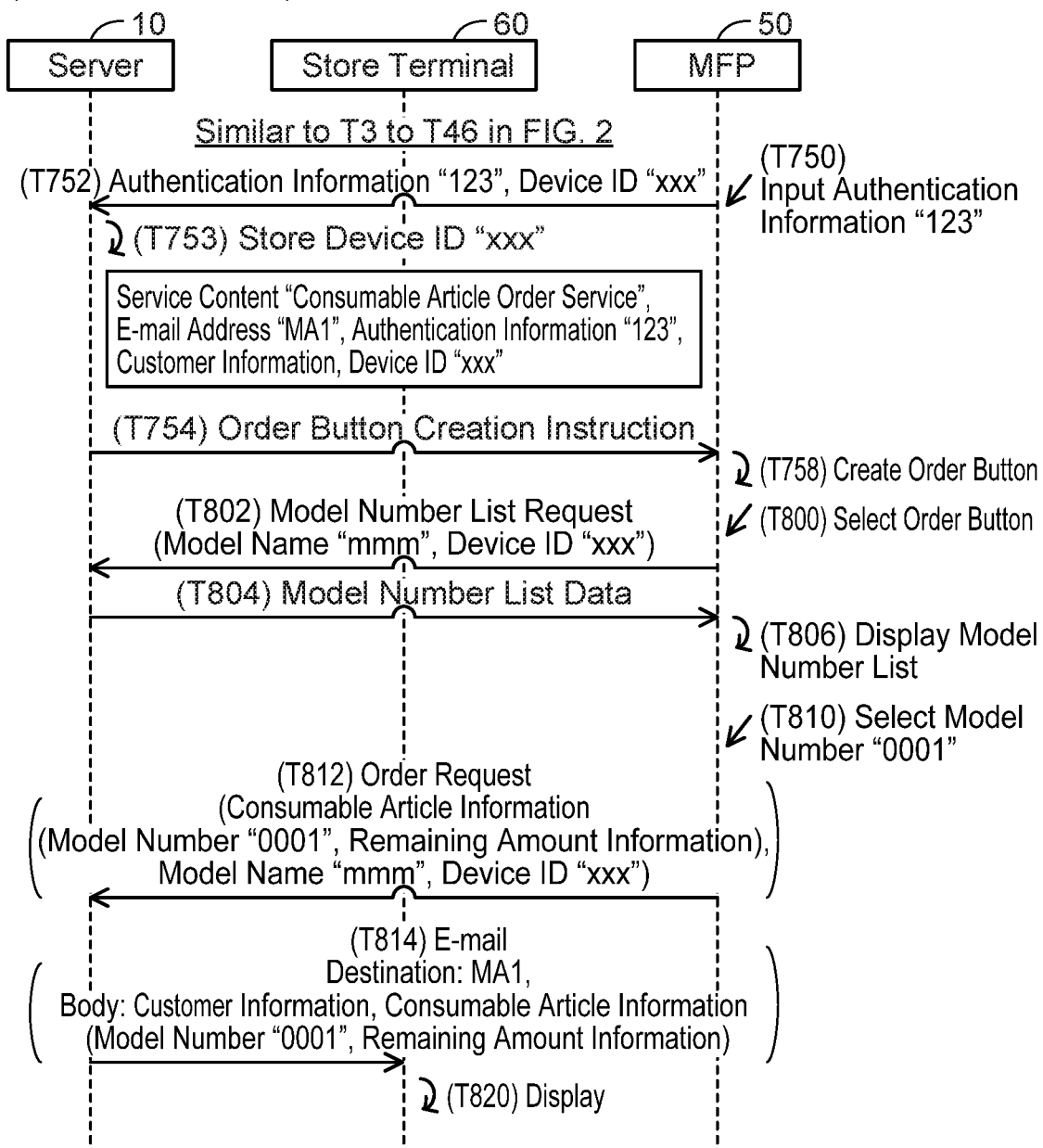
FIG. 8 shows a sequence diagram of a third embodiment.

Third Embodiment; FIG. 8

Next, a third embodiment will be described with reference to FIG. 8. The third embodiment is different from the first embodiment in that, in the same situation as Case A of the first embodiment, the order button creation instruction (see T54 of FIG. 2) does not include the e-mail address MA1.

T3 to T46 of FIG. 8 are similar to T3 to T46 of FIG. 2. In response to accepting input of the authentication information "123" from the salesperson in T750, the MFP 50 sends the authentication information "123" and the device ID "xxx" of the MFP 50 to the server 10.

In response to receiving the authentication information "123" and the device ID "xxx" from the MFP 50 in T752, the server 10 specifies service information including the received authentication information "123" from the memory 34, stores the device ID "xxx" in the specified service information in T753 and, in T754, sends an order button creation instruction to the MFP 50. The order button creation instruction does not include the e-mail address MA1 associated with the received authentication information "123".

T800 to T812 are similar to T100 to T112 of FIG. 3 except that the device ID "xxx" is used instead of the e-mail address MA1. In response to receiving the order request from the MFP 50 in T812, the server 10 specifies the e-mail address MA1 and the customer information associated with the device ID "xxx" in the order request from the memory 34 and, in T814, sends an e-mail. The e-mail includes the specified e-mail address MA1 as the destination address, and includes a body in which the specified customer information and the received consumable article information are written. T820 is similar to T120. When T820 ends, the process of FIG. 8 ends.

Effect of Present Embodiment

In the present embodiment as well, the sending of the e-mail including the e-mail address MA1 as the destination address, and including the related information related to the MFP 50 (i.e., consumable article information), can be realized without the user inputting the e-mail address MA1 to the MFP 50. Further, in the present embodiment, since the MFP 50 does not need to store the e-mail address MA1, the storage amount of the memory 34 of the MFP 50 can be reduced. In the present embodiment, the device ID "xxx" is an example of "first device identification information".

Figure 9:
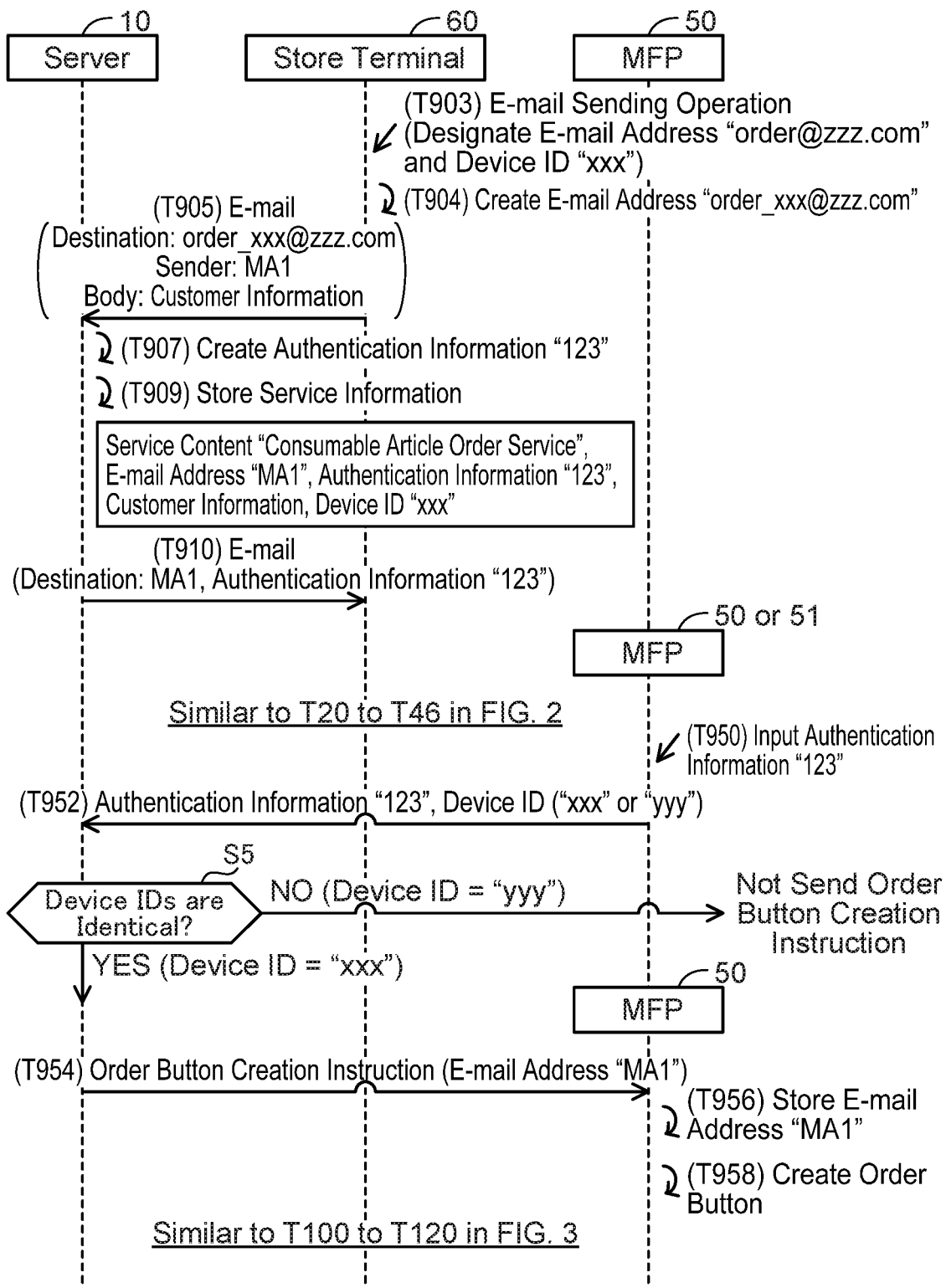
FIG. 9 shows a sequence diagram of a fourth embodiment.

Fourth Embodiment; FIG. 9

Next, a fourth embodiment will be described with reference to FIG. 9. The fourth embodiment differs from the first embodiment in that the e-mail sent from the store terminal 60 (see T5 of FIG. 2) includes the device ID "xxx" of the MFP 50. In the present embodiment as well, the situation of Case A of the first embodiment is assumed.

In T903, the store terminal 60 accepts the e-mail sending operation from the salesperson. The e-mail sending operation includes designation of the e-mail address "order@zzz.com" of the destination, designation of the device ID "xxx" of the MFP 50, and input of the customer information to the body. In this case, in T904 the store terminal 60 creates an e-mail address "order_xxx@zzz.com" by using the designated e-mail address "order@zzz.com" and the designated device ID "xxx". Then, in T905 the store terminal 60 sends an e-mail. The e-mail includes the created e-mail address "order_xxx@zzz.com" as the destination address, includes the e-mail address MA1 set in the store terminal 60 as the sender address, and includes a body in which the customer information inputted by the salesperson is written.

In a case of receiving the e-mail from the store terminal 60 in T905, the server 10 acquires the e-mail address "order@zzz.com" and the device ID "xxx" from the destination e-mail address "order_xxx@zzz.com" in the received e-mail, and specifies the service content "consumable article order service" associated with the acquired e-mail address "order@zzz.com" in the service list 38. Next, in T907 the server 10 creates the authentication information "123" and, in T909, stores the service information in the memory 34. The service information differs from T9 of FIG. 2 in further including the acquired device ID "xxx". T910 is similar to T10 of FIG. 2.

Thereafter, processes similar to T20 to T46 of FIG. 2 are executed between the server 10 and the MFP 50 or a MFP 51. A situation is also assumed in which the salesperson should use the appropriate MFP 50 to execute the processes of T20 to T46 but, in the present embodiment, the salesperson wrongly uses the MFP 51 to execute the processes of T20 to T46. Moreover, the MFP 51 has a device ID "yyy" different from the device ID "xxx" of the MFP 50. In T950, the salesperson inputs the authentication information "123" to the MFP 50 or the MFP 51. Hereinbelow, the MFP to which the authentication information "123" is inputted by the salesperson is termed a "target MFP". In T952, the target MFP sends the authentication information "123" and the device ID of the target MFP (i.e., "xxx" or "yyy") to the server 10.

In response to receiving the authentication information "123" and the device ID of the target MFP from the target MFP in T952, the server 10 executes authentication of the authentication information "123" and, in the case authentication succeeds, specifies the device ID "xxx" associated with the authentication information "123" in the memory 34.

In S5, the server 10 determines whether the device ID of the target MFP is identical with the specified device ID "xxx". In the case of determining that the device ID of the target MFP is identical with the specified device ID "xxx", i.e., in the case where the target MFP is the MFP 50, the server 10 specifies the e-mail address MA1 associated with the received authentication information "123" and, in T954, sends the order button creation instruction that includes the specified e-mail address MA1, to the MFP 50. As a result, in response to receiving the order button creation instruction from the server 10 in T954, in T956 the MFP 50 stores the e-mail address MA1 in the order button creation instruction and, in T958, creates the order button in the standby screen. Thereafter, processes similar to T100 to T120 of FIG. 3 are executed.

On the other hand, in a case of determining that the device ID of the target MFP is not identical to the specified device ID "xxx" (NO in S5), i.e., in the case where the target MFP is the MFP 51, the server 10 does not send the order button creation instruction. As a result, since the order button is not created in the standby screen in the MFP 51, the salesperson can recognize that there had been a mistake on the MFP to which the authentication information "123" should have been inputted.

Effect of Present Embodiment

In the present embodiment as well, it is possible to realize the sending of the e-mail including the e-mail address MA1 as the destination address, and including the related information (i.e., the consumable article information) related to the MFP 50, without the user inputting the e-mail address MA1 to the MFP 50. Further, in the present embodiment, the server 10 does not send the order button creation instruction in the case where the device ID sent from the target MFP is not identical with the device ID "xxx" that is being stored in the memory 34, i.e., in the case of receiving the authentication information "123" from the MFP 51 which has the device ID different from the device ID designated in T903. Consequently, it is possible to prevent the wrongful provision of the consumable article sending service for the MFP 51 not designated by the salesperson, and to appropriately provide the consumable article sending service for the MFP 50 designated by the salesperson. In the present embodiment, the device ID "xxx" in the e-mail of T905 is an example of "second device identification information".

Figure 10:
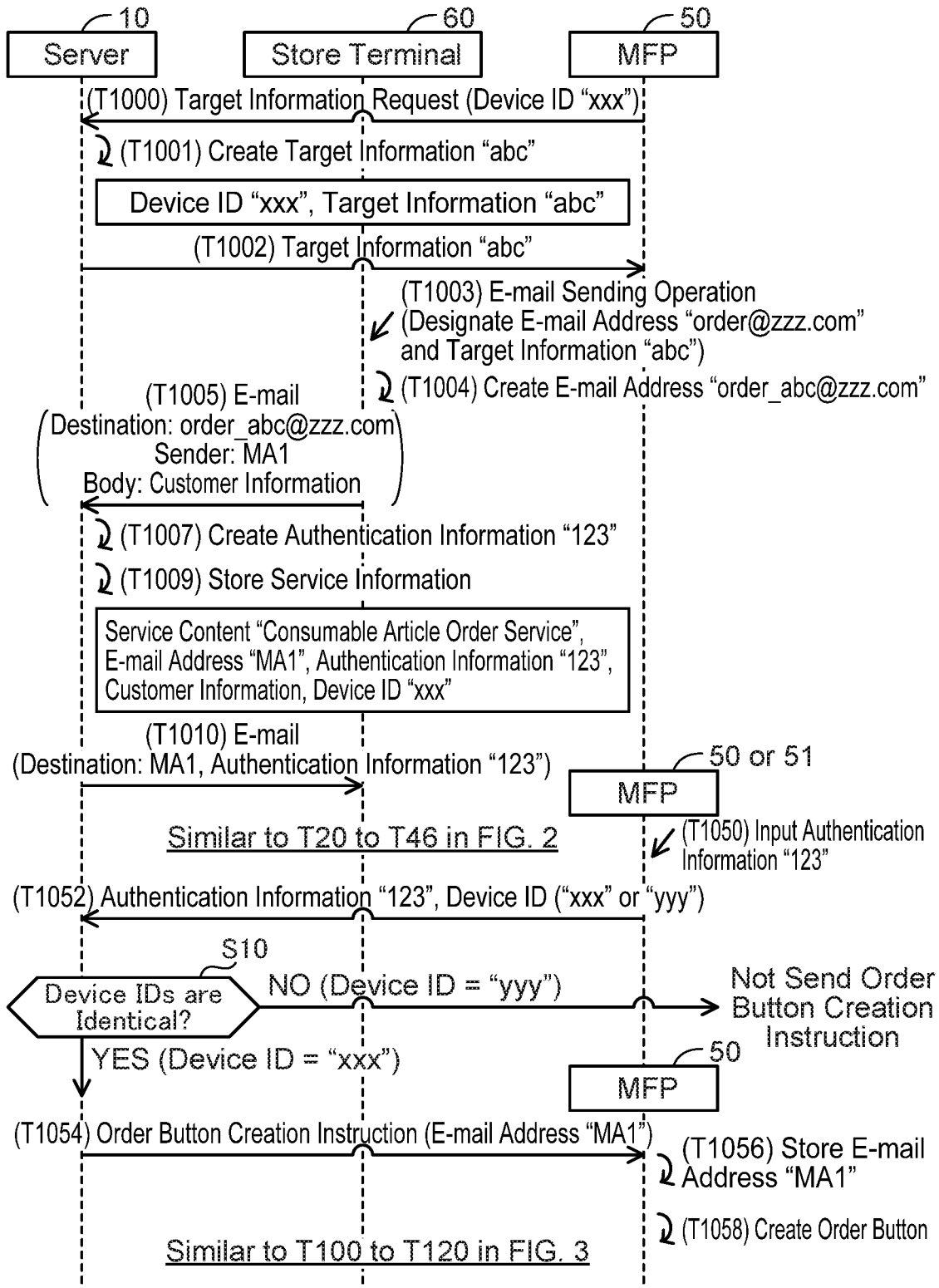
FIG. 10 shows a sequence diagram of a fifth embodiment.

Fifth Embodiment; FIG. 10

Next, a fifth embodiment will be described with reference to FIG. 10. The fifth embodiment differs from the first embodiment in that the e-mail sent from the store terminal 60 (see T5 of FIG. 2) includes target information having a unique character string. The same situation as in the fourth embodiment is assumed in the fifth embodiment.

In T1000, in response to execution of a predetermined operation by the salesperson, the MFP 50 sends a target information request, to the server 10, requesting the server 10 to send target information. The target information request includes the device ID "xxx" of the MFP 50.

In response to receiving the target information request from the MFP 50 in T1000, in T1001 the server 10 creates target information "abc" having a unique character string, and stores the device ID "xxx" in the received target information request, and the created target information "abc", in the memory 34 in association with each other. In T1002, the server 10 sends the created target information "abc" to the MFP 50. As a result, since the target information "abc" is displayed in the MFP 50, the salesperson can learn the target information "abc".

In T1003, the store terminal 60 accepts an e-mail sending operation from the salesperson. The e-mail sending operation includes designation of the e-mail address "order@zzz.com" of the destination, input of the customer information to the body, and designation of the target information "abc". In this case, in T1004 the store terminal 60 uses the designated e-mail address "order@zzz.com" and the target information "abc" to create an e-mail address "order_abc@zzz.com". Then, in T1005 the store terminal 60 sends an e-mail. The e-mail includes the created e-mail address "order_abc@zzz.com" as the destination address. That is, the e-mail includes the target information "abc".

In response to receiving the e-mail from the store terminal 60 in T1005, the server 10 acquires the e-mail address "order@zzz.com" and the target information "abc" from the destination e-mail address "order_abc@zzz.com" in the received e-mail, specifies the service content "consumable article order service" associated with the acquired e-mail address "order@zzz.com" in the service list 38, and specifies the device ID "xxx" associated with the acquired target information "abc" in the memory 34. Next, in T1007 the server 10 stores service information in the memory 34. The service information is similar to the service information of T909 of FIG. 9. T1010 is similar to T910 of FIG. 9.

Thereafter, as in the fourth embodiment, processes similar to T20 to T46 of FIG. 2 are executed by the server 10 and the target MFP (i.e., the MFP 50 or 51). T1050 and T1052 are similar to T950 and 952 of FIG. 9. S10 is similar to S5 of FIG. 9. In a case where the target MFP is the MFP 50 (YES in S10), the server 10 specifies the e-mail address MA1 associated with the received authentication information "123" and, in T1054, sends the order button creation instruction that includes the specified e-mail address MA1 to the MFP 50. T1056 and T1058 are similar to T956 and T958 of FIG. 9. Thereafter, processes similar to T100 to T120 of FIG. 3 are executed.

On the other hand, in a case where the target MFP is the MFP 51 (NO in S10), the server 10 does not send the order button creation instruction. As a result, since the order button is not created in the standby screen in the MFP 51, the salesperson can recognize that there had been a mistake on the MFP to which the authentication information "123" should have been inputted. In the present embodiment as well, the same effect as in the fourth embodiment can be obtained.

(Variant 1) In response to the model number "0001" in the model number list being selected by the user in T110 of FIG. 3, the MFP 50 may send an e-mail which includes the e-mail address MA1 stored in T56 of FIG. 2 as the destination address, and includes a body in which the consumable article information is written. In this case, T112 and T114 are not executed. In the present variant, the process of T54 to T104 of FIG. 4 is an example of "predetermined process". Described generally, "second e-mail" may be sent by the server, or may be sent by the first communication device.

(Variant 2) In T5 of FIG. 2, the server 10 may receive an e-mail from a different device than the store terminal 60. In this case, e.g., the salesperson executes the e-mail sending operation in the different device than the store terminal 60 to send the e-mail including the e-mail address "order@zzz.com" as the destination address, and including the body in which the e-mail address MA1 set in the store terminal 60 is written. In response to receiving the e-mail from the device, in T9 the server 10 stores, in the memory 34, the service information which includes the e-mail address MA1 in the body of the received e-mail. In the present variant, the different device than the store terminal 60 is an example of "terminal device". Further, in the present variant, "target e-mail address" may not be the e-mail address set in the terminal device, and "predetermined process" may not be a process necessary for sending the second e-mail to the terminal device.

(Variant 3) The process of T3 and T5 of FIG. 2 may be omitted. In this case, the server 10 receives designation information including the e-mail address "order@zzz.com", the e-mail address MA1, and the customer information from the store terminal 60 by using a communication different from the e-mail communication (e.g., a communication according to HTTP). Then, the server 10 sends an e-mail including the e-mail address MA1 in the received designation information as the destination address, and including a body in which the authentication information "123" is written. That is, "receive a target e-mail address" may receive the target e-mail address by a different method than e-mail.

(Variant 4) The processes of T904 of FIG. 9 and T1004 of FIG. 10 may be omitted. In this case, e.g., in response to accepting the e-mail sending operation from the salesperson in T903, the store terminal 60 may send an e-mail including the e-mail address "order@zzz.com" designated by the salesperson as the destination address, including the e-mail address MA1 set in the store terminal 60 as the sender address, and including a body in which the customer information inputted by the salesperson and the device ID "xxx" designated by the salesperson, are written.

(Variant 5) In the above embodiments, the device ID "xxx" was used as the information for identifying the MFP 50. However, e.g., a MAC address of the MFP 50 may be used instead of the device ID "xxx". That is, "first device identification information" may be any information for identifying "first communication device".

(Variant 6) "First communication device" is not restricted to the MFP 50, but may be e.g., a printer, a scanner, a smartphone, a PC, or a server.

(Variant 7) In the above embodiments, the respective processes of FIGS. 2 to 10 are implemented by software (that is, the program 36), however, at least one of these processes may be implemented by hardware such as a logic circuit.

What is claimed is:

1. A server comprising:
a processor; and
a memory storing computer-readable instructions therein, the computer-readable instructions, when executed by the processor, causing the server to:
receive a target e-mail address from a terminal device, wherein the target e-mail address is an e-mail address being set in the terminal device and is received from the terminal device by receiving a third e-mail including the target e-mail address as a sender address;
in a case where the target e-mail address is received from the terminal device, store in the memory the target e-mail address and authentication information in association with each other;
in the case where the target e-mail address is received from the terminal device, send a first e-mail including the target e-mail address, as a destination address, and the authentication information;
in a case where an input operation of the authentication information is executed by a user in a first communication device different from the terminal device after the first e-mail has been sent, receive the authentication information from the first communication device;
in a case where the authentication information is received from the first communication device, specify the target e-mail address associated with the authentication information in the memory; and
in a case where the target e-mail address is specified, execute a predetermined process by using the target e-mail address, the predetermined process being a process which is necessary for the server or the first communication device to send to the terminal device a second e-mail including the target e-mail address, as a destination address, and related information related to the first communication device.

2. The server as in claim 1, wherein
the memory stores, for each of a plurality of types of the predetermined process, process identification information corresponding to the type of the predetermined process and an e-mail address corresponding to the type of the predetermined process in association with each other,
the third e-mail includes the target e-mail address as the sender address and one e-mail address among a plurality of e-mail addresses corresponding to the plurality of types of the predetermined process in the memory as a destination address, and
the computer-readable instructions, when executed by the processor, further cause the server to:
in a case where the third e-mail is received from the terminal device, specify target process identification information among a plurality of process identification information corresponding to the plurality of types of the predetermined process in the memory, the target process identification information being process identification information associated with the one e-mail address which is the destination address included in the third e-mail,
wherein the target e-mail address which is the sender address included in the third e-mail, the authentication information, and the target process identification information are stored in the memory in association with each other, and
the computer-readable instructions, when executed by the processor, further cause the server to:
in the case where the authentication information is received from the first communication device, specify the target process identification information associated with the authentication information in the memory,
wherein in a case where the target e-mail address and the target process identification information are specified, a type of the predetermined process identified by the target process identification information among the plurality of types of the predetermined process is executed by using the target e-mail address.

3. The server as in claim 1, wherein
the third e-mail further includes specific information as an e-mail body,
in a case where the third e-mail is received from the terminal device, the target e-mail address, the authentication information, and the specific information are stored in the memory in association with each other, and
the predetermined process is a process which is necessary for the server or the first communication device to send the second e-mail that includes, as an e-mail body, the specific information associated with the target e-mail address in the memory to the terminal device.

4. The server as in claim 1, wherein
the related information includes at least any one of information related to a consumable article attached to the first communication device, information related to an error occurring in the first communication device and scan data obtained by scanning executed by the first communication device.

5. The server as in claim 1, wherein
in the case where the input operation of the authentication information is executed by the user in the first communication device, the authentication information and first device identification information for identifying the first communication device are received from the first communication device, in a case where the authentication information and the first device identification information are received from the first communication device, the target e-mail address associated with the authentication information in the memory is specified, and the computer-readable instructions, when executed by the processor, further cause the server to:

in a case where the target e-mail address is specified, store in the memory the target e-mail address and the first device identification information in association with each other, wherein in a case where the first device identification information is received from the first communication device after the target e-mail address and the first device identification information have been stored in the memory in association with each other, the predetermined process is executed by using the target e-mail address associated with the first device identification information in the memory.

6. The server as in claim 1, wherein the target e-mail address and second device identification information for identifying a second communication device are received from the terminal device, in a case where the target e-mail address and the second device identification information are received from the terminal device, the target e-mail address, the authentication information and the second device identification information are stored in the memory in association with each other, in a case where the input operation of the authentication information is executed by the user in the first communication device after the target e-mail address, the authentication information and the second device identification information have been stored in the memory in association with each other, the authentication information and first device identification information for identifying the first communication device are received from the first communication device, and the computer-readable instructions, when executed by the processor, further cause the server to:

in a case where the authentication information and the first device identification information are received from the first communication device, determine whether the first device identification information is identical to the second device identification information associated with the authentication information in the memory, wherein in a case where it is determined that the first device identification information is identical to the second device identification information, the predetermined process is executed by using the target e-mail address, and in a case where it is determined that the first device identification information is not identical to the second device identification information, the predetermined process is not executed.

7. The server as in claim 1, wherein the computer-readable instructions, when executed by the processor, further cause the server to:

receive second device identification information for identifying a second communication device from the second communication device;

in a case where the second device identification information is received from the second communication device, store in the memory the second device identification information and target information different from the second device identification information in association with each other; and in the case where the second device identification information is received from the second communication device, send the target information to the second communication device, wherein the target e-mail address and the target information are received from the terminal device, in a case where the target e-mail address and the target information are received from the terminal device, the target e-mail address, the authentication information, and the second device identification information associated with the target information in the memory is stored in the memory in association with each other, in a case where the input operation of the authentication information is executed by the user in the first communication device after the target e-mail address, the authentication information, and the second device identification information have been stored in the memory in association with each other, the authentication information and first device identification information for identifying the first communication device are received from the first communication device, and the computer-readable instructions, when executed by the processor, further cause the server to:

in a case where the authentication information and the first device identification information are received from the first communication device, determine whether the first device identification information is identical to the second device identification information associated with the authentication information in the memory, wherein in a case where it is determined that the first device identification information is identical to the second device identification information, the predetermined process is executed by using the target e-mail address, and in a case where it is determined that the first device identification information is not identical to the second device identification information, the predetermined process is not executed.

8. A server comprising:

a processor; and a memory storing computer-readable instructions therein, the computer-readable instructions, when executed by the processor, causing the server to:

receive a target e-mail address from a terminal device;

in a case where the target e-mail address is received from the terminal device, store in the memory the target e-mail address and authentication information in association with each other;

in the case where the target e-mail address is received from the terminal device, send a first e-mail including the target e-mail address, as a destination address, and the authentication information;

in a case where an input operation of the authentication information is executed by a user in a first communication device different from the terminal device after the first e-mail has been sent, receive the authentication information from the first communication device;

in a case where the authentication information is received from the first communication device, specify the target e-mail address associated with the authentication information in the memory; and in a case where the target e-mail address is specified, execute a predetermined process by using the target e-mail address, the predetermined process being a process which is necessary for the server or the first communication device to send a second e-mail including the target e-mail address, as a destination address, and related information related to the first communication device, the related information including at least any one of information related to a consumable article attached to the first communication device, information related to an error occurring in the first communication device, and scan data obtained by scanning executed by the first communication device.

9. The server as in claim 8, wherein
in the case where the input operation of the authentication information is executed by the user in the first communication device, the authentication information and first device identification information for identifying the first communication device are received from the first communication device,
in a case where the authentication information and the first device identification information are received from the first communication device, the target e-mail address associated with the authentication information in the memory is specified, and
the computer-readable instructions, when executed by the processor, further cause the server to:
in a case where the target e-mail address is specified, store in the memory the target e-mail address and the first device identification information in association with each other,
wherein in a case where the first device identification information is received from the first communication device after the target e-mail address and the first device identification information have been stored in the memory in association with each other, the predetermined process is executed by using the target e-mail address associated with the first device identification information in the memory.

10. The server as in claim 8, wherein
the target e-mail address and second device identification information for identifying a second communication device are received from the terminal device,
in a case where the target e-mail address and the second device identification information are received from the terminal device, the target e-mail address, the authentication information and the second device identification information are stored in the memory in association with each other,
in a case where the input operation of the authentication information is executed by the user in the first communication device after the target e-mail address, the authentication information and the second device identification information have been stored in the memory in association with each other, the authentication information and first device identification information for identifying the first communication device are received from the first communication device, and
the computer-readable instructions, when executed by the processor, further cause the server to:
in a case where the authentication information and the first device identification information are received from the first communication device, determine whether the first device identification information is identical to the second device identification information associated with the authentication information in the memory,
wherein in a case where it is determined that the first device identification information is identical to the second device identification information, the predetermined process is executed by using the target e-mail address, and
in a case where it is determined that the first device identification information is not identical to the second device identification information, the predetermined process is not executed.

11. The server as in claim 8, wherein
the computer-readable instructions, when executed by the processor, further cause the server to:
receive second device identification information for identifying a second communication device from the second communication device;
in a case where the second device identification information is received from the second communication device, store in the memory the second device identification information and target information different from the second device identification information in association with each other; and
in the case where the second device identification information is received from the second communication device, send the target information to the second communication device,
wherein the target e-mail address and the target information are received from the terminal device,
in a case where the target e-mail address and the target information are received from the terminal device, the target e-mail address, the authentication information, and the second device identification information associated with the target information in the memory is stored in the memory in association with each other,
in a case where the input operation of the authentication information is executed by the user in the first communication device after the target e-mail address, the authentication information, and the second device identification information have been stored in the memory in association with each other, the authentication information and first device identification information for identifying the first communication device are received from the first communication device, and
the computer-readable instructions, when executed by the processor, further cause the server to:
in a case where the authentication information and the first device identification information are received from the first communication device, determine whether the first device identification information is identical to the second device identification information associated with the authentication information in the memory,
wherein in a case where it is determined that the first device identification information is identical to the second device identification information, the predetermined process is executed by using the target e-mail address, and
in a case where it is determined that the first device identification information is not identical to the second device identification information, the predetermined process is not executed.

12. A server comprising:
a processor; and
a memory storing computer-readable instructions therein, the computer-readable instructions, when executed by the processor, causing the server to:
receive a target e-mail address from a terminal device;
in a case where the target e-mail address is received from the terminal device, store in the memory the target e-mail address and authentication information in association with each other;
in the case where the target e-mail address is received from the terminal device, send a first e-mail including the target e-mail address, as a destination address, and the authentication information;

in a case where an input operation of the authentication information is executed by a user in a first communication device different from the terminal device after the first e-mail has been sent, receive the authentication information and first device identification information for identifying the first communication device from the first communication device;

in a case where the authentication information and the first device identification information are received from the first communication device, specify the target e-mail address associated with the authentication information in the memory;

in a case where the target e-mail address is specified, store in the memory the target e-mail address and the first device identification information in association with each other; and in a case where the first device identification information is received from the first communication device after the target e-mail address and the first device identification information have been stored in the memory in association with each other, execute a predetermined process by using the target e-mail address associated with the first device identification information in the memory, the predetermined process being a process which is necessary for the server or the first communication device to send a second e-mail including the target e-mail address, as a destination address, and related information related to the first communication device.

* * * * *